INVENTORS
WALTER A. MILLER
STEPHEN O. COOK

United States Patent Office 2,987,776
Patented June 13, 1961

2,987,776
METHOD OF BIAXIALLY STRETCHING TUBULAR STYRENE POLYMER FILM BY INFLATING WITH GAS AND LIQUID
Walter A. Miller, North Caldwell, and Stephen O. Cook, Bloomfield, N.J., assignors to Union Carbide Corporation, a corporation of New York
Filed Dec. 23, 1957, Ser. No. 704,572
6 Claims. (Cl. 18—57)

This invention relates to the production of plastic film and tubing. More particularly, this invention relates to a process for the continuous production of molecularly oriented thermoplastic film.

The mechanical properties of certain organic polymers, such as synthetic long chain polymers, can be substantially improved by subjecting such polymeric material to a drawing operation, at suitable temperatures, whereby the molecules of the polymer are oriented in the direction or directions in which the stretch is applied.

It has been proposed to produce molecularly oriented sheet material by extruding a hot ribbon of thermoplastic polymer and stretching the extruded ribbon simultaneously, in both the longitudinal and the transverse directions. Conventionally, biaxially orienting plastic film has involved the engagement of the edges of the sheet material by stretching devices which are intended to stretch the sheets simultaneously in two directions. These stretching devices, however, have been found objectionable as the desired amount of longitudinal stretching is limited by the engagement of the edges of the ribbon by the relatively fixed transverse stretching devices. Such devices are particularly undesirable when used to stretch normally brittle thermoplastic material such as polystyrene. Polystyrene polymers are extremely brittle at room temperature and at this temperature fracture very readily when subjected to an outside force. In stretching polystyrene sheets, the engagement of the edges of the sheet material by the relatively cold edge engaging stretching devices cools the edges of the plastic material to such an extent that the material often fractures and frays.

It is an object of this invention therefore, to provide a process for producing molecularly oriented thermoplastic material by biaxially stretching the said material wherein the disadvantages of prior processes are substantially eliminated.

Another object of this invention is to provide a method for producing thin self-sustaining seamless tubing from thermoplastic polymers.

Accordingly, the present invention provides a process for imparting molecular orientation to unplasticized, addition type thermoplastic polymers by a multi-directional stretching operation which comprises hot extruding the thermoplastic in the form of a continuous length of tubing, substantially maintaining the tubing at its extruded diameter while cooling the tubing to its rubbery, formative state, thereafter expanding said tubing in a temperature control liquid bath, the temperature of the bath being maintained above that at which the tubing becomes drawable but below its viscous flow temperature and at that temperature range within which the tubing is in the rubbery, formative state and can be biaxially stretched to effect an orientation of the molecules thereof, by introducing and maintaining under pressure a constant head of a non-solvent inert fluid within the tubing located in the liquid bath whereby the fluid pressure within the tubing stretches the said tubing both longitudinally and transversely, withdrawing the biaxially stretched tubing from the temperature control liquid bath and allowing the resultant expanded molecularly oriented tubing to cool and set at room temperature.

Reference is now made to the accompanying drawings in which

Figure 1:
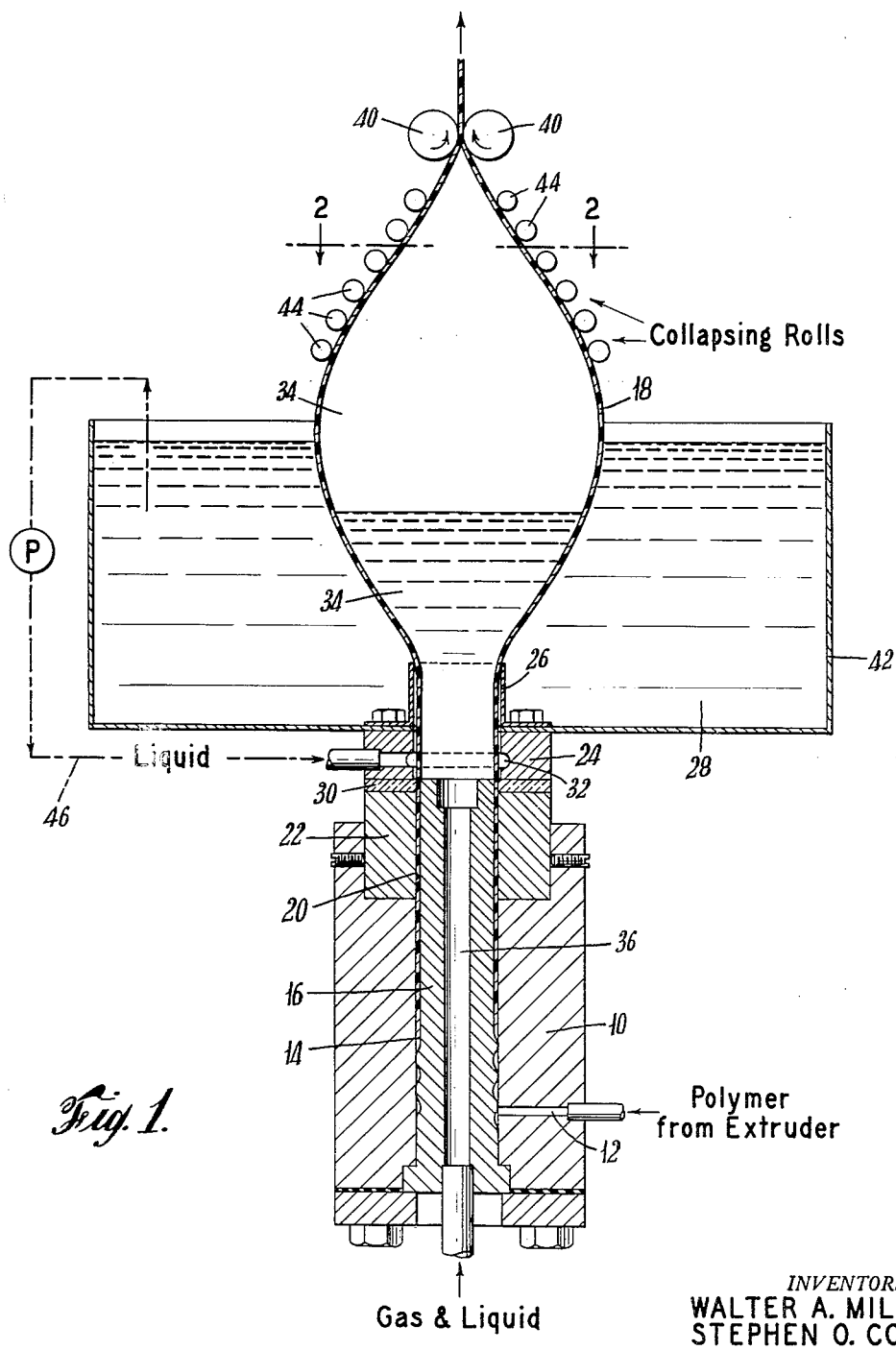
FIGURE 1 is a sectional view of an apparatus for carrying out this invention.

Pellets of a thermoplastic material are fed to a heating zone of a conventional extruder and melted. Molten plastic is then forced into die head 10 of an extrusion die by way of passage 12. In the die head the molten plastic is forced through an annular passage 14 between the forming pin 16 and the die head 10 and emerges as a tubular shaped body 18 from an annular orifice 20 whose size is controlled by a complementary adjusting ring 22 mounted on die head 10. The tubing 18 is drawn upwardly through a sizing die 26 whose base 24 is mounted on the complementary adjusting ring 22. The sizing die 26 extends up into a temperature control liquid bath which aids in bringing and maintaining the tubing at a temperature at which it can be stretched to effect a molecular orientation. The sizing die 26 aids in maintaining the diameter of the tubing substantially constant until the tubing is cooled to a temperature range within which it can be biaxially stretched to effect a molecular orientation. The sizing die base 24 is isolated from the relatively hot adjusting ring 22 by means of insulation 30. The sizing die base 24 also has an annular groove 32 into which is continuously pumped a lubricating fluid 46, usually from the liquid bath 28. The lubricating fluid 46 circulates in the annular groove 32 and fills up the annular space between the walls of the sizing die and the walls of the extruded tubing before passing into the liquid bath. The lubricating fluid 46 prevents the extruded tubing from sticking to the walls of the sizing die 26 and also serves to quench the hot tubing.

During the starting up cycle of the process the liquid bath 28 is filled to a level just below the height of the sizing die 26, and the emergent tube is sealed off and fed to rotating pinch rolls 40 which pinch together the walls of the tubing. The bath is then filled with additional liquid to a level just below the top of the vessel 42. Meanwhile a fluid 34 comprising a mixture of liquid and a gas is internally introduced into the tubing 18 through passageway 36 of the forming pin 16 and maintained under pressure at a constant head therein, dependent on the amount of stretching desired. The air rides as an entrapped bubble between the pinch rolls 40 and the internal liquid. The tubing 18 can either be allowed to expand freely against the pressure exerted by the liquid bath 28 or against a forming shield 38 shown in FIGURE 3.

The peripheral speed of the rotating pinch rolls 40 can be regulated to control the rate of withdrawal of the tubing 18 from the sizing die 26. The pinch rolls 40 (as previously stated) also serve to collapse the tubing after the tubing leaves the liquid bath, thus preventing a carrying of other than traces of the liquid bath fluid 28 and inflating liquid fluid beyond the pinch rolls 40.

On leaving the liquid bath the tubing is cooled and set by the surrounding atmosphere and is thereafter flattened by the above-mentioned pinch rolls 40.

Figure 2:
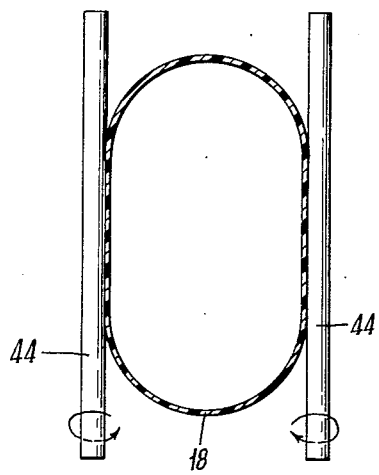
FIGURE 2 is a plan view, in section, of the collapsing rolls taken on the line of 2—2 of FIGURE 1.

The apparatus for carrying out this invention may be modified so that a series of collapsing rolls 44 are used, as is shown in FIGURES 1 and 2 to aid in collapsing the expanded tube as it passes out of the liquid bath.

Figure 3:
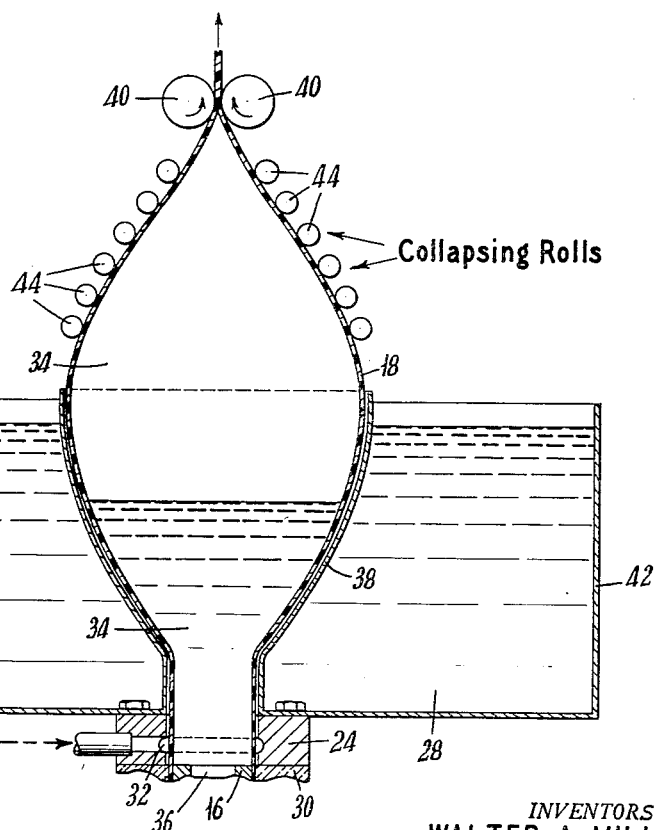
FIGURE 3 is a partial section of a modification of the apparatus of FIGURE 1 wherein the tubing is expanded against a forming shield.

Another modification is the use of a forming shield 38, shown in FIGURE 3, against which the tubing is expanded.

Generally, in the practice of this invention a thermoplastic material, usually in the form of pellets is fed into a conventional extruder where it is heated to an appropriate temperature, usually in the order of 20° C. to 30° C. above its viscous or liquid flow temperature. The molten polymer is fed to a die head of an extrusion die positioned at the outlet end of the extruder.

The die head is generally provided with a complementary adjusting ring which forms an extended annular orifice with the forming pin of the die head and which therefore controls the diameter and the uniformity of the wall thickness of the extruded tubing. After the tubing is extruded it is maintained at its extruded diameter until it is cooled to a temperature at which molecular orientation can be imparted thereto by a stretching operation. As one means of preventing any expansion of the diameter of the tubing prior to the cooling described in the preceding sentence a sizing die is mounted on the aforementioned adjusting ring and extends upwardly for a short distance into a temperature control liquid bath. The diameter of the tubing is thereby not allowed to expand until after the tubing has been drawn into the liquid bath and cooled to its rubbery formative state. The tubing is prevented from collapsing by the pressure of the internal inflating fluid maintained within the tubing. The temperature range in which the thermoplastic is in its rubbery formative state is above that at which the tubing becomes drawable but below the viscous or liquid flow temperature thereof. In the rubbery formative state the tubing is capable of being biaxially stretched to effect a molecular orientation.

As the tubing is being passed into the temperature control liquid bath a lubricating fluid is maintained on the outer wall of the tubing. As a convenient means of introducing and maintaining such a lubricating film, the sizing die base can be provided with an annular groove and fluid continuously pumped into this groove from the liquid bath. The rate of fluid pumped into the groove is such that the fluid fills up the annular groove, then fills the space between the walls of the sizing die and the tubing and passes into the liquid bath. Thus there is maintained a lubricating film between the walls of the sizing die and the extruded tubing. The lubricating film prevents the sticking of the tubing to the walls of the sizing die as the tubing is being drawn upwardly into the liquid bath.

The lubricating fluid, in actuality, performs a dual function for it not only lubricates but also aids in cooling the hot extruded tubing. Cooling the tubing from its extrusion temperature down to the temperature at which the tubing is in the non-viscous but still rubbery formative state while maintaining the diameter of the tubing substantially constant is essential for if the diameter of the tubing were expanded at its extrusion temperature, there would result a brittle film, upon slitting of the tubing, having the same physical properties as did the initial material. Cooling of the tubing is therefore necessary, prior to expanding the diameter of the tubing, to a stage where stretching will impart a molecular orientation.

Maintaining the diameter of the extruded tubing substantially constant until the tubing has been cooled to its proper temperature is actually important for two reasons; one reason as previously stated is that expansion at a temperature above which the tubing is in its rubbery formative state results in a product with the same physical properties as the original material. On the other hand, if the tubing were collapsed, prior to cooling to a temperature at which molecular orientation can be imparted, it would be difficult to reinflate and often such attempted reinflation results in a rupture of the tubing. As previously stated, the stage at which the polymer is capable of being stretched to impart molecular orientation thereto is the so-called rubbery state as opposed to the viscous state. The thermoplastic material in this state is in a formative state such that upon being stretched the molecules of the thermoplastic are oriented in the direction or directions in which the stretch was applied.

A detailed explanation of the "rubbery formative state" of thermoplastic materials is to be found in an article by Arthur V. Tobolsky appearing in the September 1957 issue of Scientific American entitled "The Mechanical Properties of Polymers."

From the extrusion apparatus the tubing is drawn directly up into the liquid bath, inert with respect to the thermoplastic, which maintains the temperature of the tubing at a range in which the molecules of the tubing can be oriented by a stretching operation. Passing the tubing directly into the liquid bath is especially advantageous when the thermoplastic material which is being stretched is easily oxidized by the atmosphere at the relatively high extrusion temperatures. Another advantage in extruding the tubing directly into the liquid bath is that exposure of the hot, thin thermoplastic tubing to the atmosphere before molecular orientation of the material has been effected generally cools the thermoplastic back to its original and usually brittle state and therefore increases the difficulties attendant on re-establishing and maintaining the thermoplastic material in its rubbery formative state. To reiterate, maintaining an accurate control of the temperature of the thermoplastic material at a range within which the thermoplastic has rubbery characteristics is necessary, for at higher temperatures, stretching of the thermoplastic does not impart any beneficial properties thereto such for example as an increase in its tensile strength. On the other hand at lower temperatures, the thermoplastic material, such as polystyrene becomes exceedingly brittle. Any attempted stretching of the polymer in its brittle state causes the material to fracture.

As the tubing is drawn up through the liquid bath in a substantially vertical direction and then into the surrounding atmosphere, usually by a pair of pinch rolls which also serve to collapse the tubing, a head of a fluid medium inert with respect to the thermoplastic material and usually comprising a mixture of a liquid lubricant and an inert gas is maintained under pressure within the portion of the tubing located in the liquid bath. The specific gravity of the liquid lubricant is preferably the same or slightly greater than the specific gravity of the liquid bath.

A gas may be used as the sole inflating medium but it is not preferred. A gas pressure generally gives too great a buoyant effect to the tubing, causing it to bob up and down in the bath. Using only a liquid tends to cause a distortion of that portion of the tubing located without the liquid bath.

In practice the inflating fluid within that portion of the tubing located within the liquid bath is generally a liquid and a gas, the gas riding as an entrapped bubble between the internal liquid and the pinch rolls. Using a liquid-gas combination a more uniform expansion of the tubing is effected without uneven distortion of any part of the tubing. The level of the internal liquid is generally a little lower than the level of the liquid of the external liquid bath.

The temperature of the internal fluid is generally on the order of the temperature of the liquid bath fluid. The gas is injected into the interior of the tubing at room temperature.

The effective pressure exerted by the fluid medium within that portion of the tubing located in the liquid bath inflates the tubing to a diameter greater than that of the tubing at the point of extrusion or formation.

The internal fluid also serves to prevent a collapse of the tubing prior to its being molecularly oriented.

The speed of the rotating pinch rolls, positioned above the liquid bath and on an axis perpendicular to the die orifice of the extruder apparatus, also determine the ultimate wall thickness of the tubing. By adjusting the speed of the rotating pinch rolls, hence the rate of withdrawal of the tubing from the sizing die, and the head of fluid within the tubing, the diameter and wall thickness of the tubing and therefore the degree of biaxial stretching can be readily and simultaneously controlled.

The peripheral speed of the pinch rolls is regulated so that the speed of withdrawal of the tubing from the die orifice is preferably at least about 100 percent greater than the extrusion speed of the tubing.

The flattened multi-directional stretched tubing obtained by the process and apparatus described can be used or treated in any desired manner. The tubing can be collected and stored or cut into lengths and one end of each length sealed to make a bag. Alternatively, the tube may be slit lengthwise and unfolded to form a film characterized by increased tensile strength and improved flexibility.

Among the thermoplastic materials, normally solid at room temperature, which may be biaxially stretched according to this invention may be mentioned styrene polymers such as homopolymers and copolymers of styrene, homopolymers; and copolymers of the homologues and analogues of styrene such as para-chlorostyrene, divinyl benzene, alpha methyl styrene; the nitro styrenes such as para-nitro styrene; the alkyl ring substituted styrenes such as para ethylstyrene; the vinyl naphthalenes and substituted products thereof. Among the polymerizable monomeric compounds suitable for copolymerization with styrene and styrene homologues and analogues are included, vinyl chloride, vinyl ethers, acrylic esters, acrylonitrile, vinyl carbazole, dimethalkyl maleate, dialkyl adipate, divinyl hexyl phthalate, octyl alkyl maleate, 2-ethyl hexyl acrylate esters, butyl methacrylate, hexyl methacrylate and octyl methacrylate, vinylidene chloride; copolymers of vinylidene chloride and vinyl chloride; polyolefinic polymers and copolymers illustrative of which are the polyethylenes prepared according to the processes described in U. S. Patent No. 2,153,553 and Belgium Patent No. 530,617. Polymers of propylene, butene, pentene-1, nonene-1, dodecen-1, 3-methyl - 1 - butene, 4-methyl-1-pentene, 3-melkyl-1-hexene, and 3-methyl - 1-pentene. Copolymers of these olefinic compounds such as copolymers of 3-melkyl-1-pentene and 4-methyl-1-pentene; 3-methyl-1-hexene and 4-melkyl-1-pentene.

As previously stated the process and apparatus of this invention may be used for producing biaxially stretched sheet material from various unplasticized addition type of organic polymers which are normally solid at room temperature. Specifically, but without being limited thereto, the invention contemplates the production of oriented sheets from polystyrene polymers and copolymers. Articles produced from polystyrene polymers and copolymers are ordinarily very brittle, but being a long chain type of polymer and containing long molecules, the polymer can be greatly strengthened and its brittleness substantially eliminated by application of directional stretching whereby the molecules are oriented in the direction of the stretch application. Although previously it has been difficult to orient polystyrene polymers and copolymers because of their brittle nature these difficulties are substantially eliminated by the present invention.

The following examples further illustrate our invention.

Example I

A styrene-acrylonitrile copolymer described in Canadian Patent No. 457,340 and containing about 72 percent styrene and about 28 percent acrylonitrile was fed, in the form of pea sized pellets into a Hartig extruder having an extruder bore size of 1¼ inches. The Hartig extruder had 3 heating zones 1, 2 and 3 maintained at 205° C., 235° C. and 250° C. respectively. The molten styrene acrylonitrile copolymer was screw fed into an extrusion die and extruded, at a temperature of 250° C. in the form of a continuous tubing having an outside diameter of ⅞ of an inch and a wall thickness of 1/32 of an inch, directly into a glycerine bath preheated to a temperature of between 110°–120° C. and maintained at a level of 3 inches. Glycerine was simultaneously pumped from the liquid bath into the annular groove located in the sizing die base and provided a lubricating cooling film between the walls of the sizing die and the walls of the tubing. The emergent extrudate was seized with tongs and fed into rotating pinch rolls. Additional preheated glycerine was fed into the liquid bath until a depth of 10 inches was attained. Glycerine also preheated to a temperature of between 110°–120° C. was fed into the interior of the tube immediately upon the feeding of the emergent tubing to the pinch rolls. The diameter of the tubing was kept from expanding by means of a sizing die, extending 6 inches into the liquid bath and mounted on the adjusting ring of the extrusion die. Air was thereafter introduced into the interior of the tube by means of a retractable tube which was raised above the inside liquid level. After the expanded tubing had reached a diameter of approximately 6 inches the air and liquid feeds were shut off and the air rode as an entrapped bubble above the surface level of the inside liquid which was slightly below the level of the liquid bath.

Molten styrene-acrylonitrile polymer was extruded at the rate of 5 lbs. per hour or approximately 30 inches per minute. The extruded tubing was withdrawn upwardly in a vertical direction from extrusion die through the liquid bath at a rate of 15 feet per minute by the rotating pinch rolls positioned 20 inches above the liquid bath.

After the tubing had passed out of the liquid bath it was set at its expanded diameter by the surrounding atmosphere which was the atmosphere of a room.

The following tabulated data clearly indicates the advantage of biaxially stretching thermoplastic material.

| | Oriented Tubing | Unoriented Tubing |
|---|---|---|
| Nature | Tough and Pliable | Brittle. |
| Outside Diameter | 6 inches | ⅞ of an inch. |
| Wall Thickness | 0.0015 inch | 1/32 of an inch. |
| Width of film obtained by slitting tubing. | 18 inches | 2.7 inches. |
| Tensile Strength of film (ASTM-D-882-54T-C): Tensile strength in both longitudinal and transverse directions is substantially the same. | 12,000–16,000 p.s.i. | 8,000–8,500 p.s.i. |
| Elongation of Film ASTM-D-882-54T-C both directions. | 10–12% | 2%. |
| Shrinkage (ASTM-D-1204-54 at 130° C.). | 75% | |

Example II

A polystyrene polymer having a molecule weight of about 70,000 as determined by the well known Staudinger measurement was fed, in the form of pea sized pellets, into a Hartig extruder having an extruder bore size of 1¼ inches. The Hartig extruder had 3 heating zones 1, 2 and 3 maintained at 205° C., 235° C. and 250° C. respectively. The molten polystyrene polymer was extruded into a continuous tubing having an outside diameter of ⅞ of an inch and a wall thickness of 1/32 of an inch, directly into an ethylene glycol liquid bath. The ethylene glycol had been preheated to a temperature of between 110°–120° C. The liquid level of the bath was maintained at 3 inches. Ethylene glycol was simultaneously pumped from the liquid bath into the annular groove located in the sizing die base and provided a lubricating and cooling film between the walls of the sizing die and the walls of the tubing. The emergent extrudate was seized with tongs and fed into rotating pinch rolls. Additional preheated ethylene glycol was fed into the liquid bath until a depth of 10 inches was attained. Ethylene glycol also preheated to a temperature of between 110°–120° C. was fed into the interior of the tube immediately upon the feeding of the emergent tubing to the rotating pinch rolls. Air was thereafter introduced into the interior of the tube by means of a retractable tube which was raised above the inside liquid level. After the tubing had been expanded to a diameter of about 6 inches, the liquid and air feeds were shut off and the air rode as an entrapped bubble above the surface level of the inside liquid which was slightly below the level of the liquid bath.

The diameter of the tubing was kept from expanding by means of a sizing die, extending 6 inches into the liquid bath and mounted on the adjusting ring of the extrusion die.

The molten polystyrene was extruded at the rate of 5 lbs. per hour or approximately 30 inches per minute. The extruded tubing was drawn upwardly in a vertical direction from the die and through the liquid bath at the rate of 15 feet per minute by rotating nip rolls positioned 20 inches above the liquid bath.

After the tubing had passed out of the liquid bath it was set at its expanded diameter by the surrounding atmosphere which was the atmosphere of a room.

The following tabulated data clearly indicates the advantages of biaxially stretching thermoplastic material.

|  | Oriented Tubing | Unoriented Tubing |
| --- | --- | --- |
| Nature | Tough and Pliable | Brittle. |
| Outside Diameter | 6 inches | 7/8 of an inch. |
| Wall Thickness | 0.0015 inch | 1/32 of an inch. |
| Width of film obtained by slitting the tubing. | 18 inches | 2.7 inches. |
| Tensile Strength of film ASTM-D-882-54T-C: Tensile strength in both the longitudinal and transverse directions is substantially the same. | 9,000–12,000 p.s.i. | 5,000–7,000 p.s.i. |
| Elongation of Film ASTM-D-882-54T-C (both directions). | 5–10% | 1–2%. |
| Shrinkage (ASTM-D-1204-54). | 80% | |

What is claimed is:

1. Method which comprises extruding a continuous thermoplastic tubing of a styrene polymer into a liquid bath maintained at a temperature below the viscous flow temperature of the tubing and at a temperature wherein the tubing is in the rubbery, formative state and can be molecularly oriented by a stretching operation, cooling said tubing as it passes from point of extrusion into the liquid bath, maintaining the tubing at its extruded diameter until the tubing is cooled to its rubbery, formative state while maintaining a fluid medium under pressure within the interior of the tubing, said inflating fluid, comprising liquid and gas wherein the gas rides as an entrapped bubble above said inflating liquid, exerting a pressure which expands that portion of the tubing which is in the rubbery, formative state to a diameter greater than its extruded diameter.

2. Method as defined in claim 1 wherein the thermoplastic is a polymer selected from the group consisting of polystyrene and styrene-acrylonitrile copolymer.

3. Method which comprises extruding a continuous thermoplastic tubing of a styrene polymer into a liquid bath which is maintained at a temperature below the viscous flow temperature of said tubing and at a temperature wherein the tubing is in the rubbery, formative state and can be molecularly oriented by a stretching operation, collapsing said tubing at a point spaced from said liquid bath, and between said point of extrusion and point of collapsing, cooling said tubing as it passes from the point of extrusion into the liquid bath, maintaining the tubing at its extruded diameter until the tubing is cooled to its rubbery, formative state while maintaining a fluid medium under pressure within the interior of said tubing, said fluid, being a liquid and a gas wherein the gas rides as an entrapped bubble above said liquid, exerting a pressure which expands that portion of said tubing which is in the rubbery, formative state to a diameter greater than its extruded diameter.

4. Method as defined in claim 3, wherein the inflating liquid within said tubing is at a level lower than the liquid of said liquid bath.

5. Method which comprises extruding a continuous thermoplastic tubing of a styrene polymer into a liquid bath which is maintained at a temperature below the viscous flow temperature of said tubing and at a temperature wherein the tubing is in the rubbery, formative state, withdrawing said tubing from the point of extrusion at a rate greater than the rate of extrusion, collapsing said tubing at a point spaced from said liquid bath, and between said point of extrusion and point of collapsing, cooling said tubing as it passes from the point of extrusion into the liquid bath, maintaining the tubing at its extruded diameter until the tubing is cooled to its rubbery, formative state while maintaining a fluid medium under pressure within the interior of said tubing, said fluid, being a liquid and a gas wherein the gas rides as an entrapped bubble above said liquid and said liquid is at a level lower than the liquid of said liquid bath, exerting a pressure which expands that portion of said tubing which is in the rubbery, formative state to a diameter greater than its extruded diameter.

6. Method as defined in claim 3 wherein the liquid in the liquid bath and the liquid within the tubing have the same specific gravity.

References Cited in the file of this patent

UNITED STATES PATENTS

| 2,337,927 | Reichel | Dec. 28, 1943 |
| 2,344,511 | Harder | Mar. 21, 1944 |
| 2,452,080 | Stephenson | Oct. 26, 1948 |
| 2,461,975 | Fuller | Feb. 15, 1949 |
| 2,852,813 | Longstretch | Sept. 23, 1958 |
| 2,863,172 | Buteux | Dec. 9, 1958 |

FOREIGN PATENTS

| 419,826 | Great Britain | May 18, 1934 |
| 714,915 | Great Britain | Sept. 8, 1954 |
| 741,963 | Great Britain | Dec. 14, 1955 |